(12) United States Patent
Irwin

(10) Patent No.: US 11,641,093 B2
(45) Date of Patent: May 2, 2023

(54) MULTI-FUNCTION CABINET

(71) Applicant: City of Dubuque, Dubuque, IA (US)

(72) Inventor: Todd Charles Irwin, Dubuque, IA (US)

(73) Assignee: City of Dubuque, Dubuque, IA (US)

( * ) Notice: Subject to any disclaimer, the term of this patent is extended or adjusted under 35 U.S.C. 154(b) by 74 days.

(21) Appl. No.: 17/493,115

(22) Filed: Oct. 4, 2021

(65) Prior Publication Data
US 2022/0149600 A1     May 12, 2022

Related U.S. Application Data

(60) Provisional application No. 63/111,272, filed on Nov. 9, 2020.

(51) Int. Cl.
   *H02B 1/30*           (2006.01)
   *H02B 1/14*           (2006.01)
   *H02B 1/20*           (2006.01)

(52) U.S. Cl.
CPC .............. *H02B 1/30* (2013.01); *H02B 1/14* (2013.01); *H02B 1/202* (2013.01)

(58) Field of Classification Search
CPC ........................................................ H02B 1/03
See application file for complete search history.

(56) References Cited

U.S. PATENT DOCUMENTS

| | | | | |
|---|---|---|---|---|
| 3,496,420 A | * | 2/1970 | Leonard | H02B 1/40 361/620 |
| 5,801,632 A | * | 9/1998 | Opal | F25D 29/008 361/691 |
| 8,547,686 B2 | * | 10/2013 | Pruehs | H02B 1/03 361/667 |
| D715,172 S | * | 10/2014 | Smith | D10/106.95 |
| 9,077,160 B2 | * | 7/2015 | Valencic | H02B 1/30 |
| 9,124,077 B2 | * | 9/2015 | Robinson | H02B 1/03 |
| 2005/0167135 A1 | * | 8/2005 | Jackson | H02B 1/50 174/50 |
| 2006/0265853 A1 | * | 11/2006 | Povolny | H02B 1/30 29/469 |
| 2014/0084766 A1 | * | 3/2014 | Smith | G08G 1/07 312/292 |

FOREIGN PATENT DOCUMENTS

| | | | | | |
|---|---|---|---|---|---|
| AU | 688016 B2 | * | 3/1998 | ............. | H02B 1/14 |
| CN | 113067254 A | * | 7/2021 | ............. | H02B 1/20 |
| CN | 113839317 A | * | 12/2021 | .......... | H04N 23/695 |
| CN | 115000819 A | * | 9/2022 | ............. | H02B 1/202 |
| CN | 217956708 U | * | 12/2022 | ............. | Y02E 10/56 |

* cited by examiner

*Primary Examiner* — Robert J Hoffberg
(74) *Attorney, Agent, or Firm* — Fredrikson & Byron, P.A.

(57) ABSTRACT

A multi-function cabinet housing electrical equipment. The multi-function cabinet has four compartments. Each compartment is configured to house a different type of electrical equipment. The electrical equipment may be high-voltage electrical metering and distribution components, high-voltage control electronics, battery backup, wireways, low-voltage electronics, or a combination thereof. The multi-function cabinet contains wireways. The compartments of the multifunction cabinet are accessible using doors, which are fastened by locks. The cabinet contains a ventilation system with fans, vents, and filters.

18 Claims, 13 Drawing Sheets

MULTI-FUNCTION CABINET

PRIORITY CLAIM

Applicant claims priority to provisional application Ser. No. 63/111,272, filed on Nov. 9, 2020, the entire contents of which are incorporated herein.

BACKGROUND

Many outdoors electrical enclosures, such as traffic control enclosures, comprise a plurality of cabinets which each house separate components. In some situations, each cabinet may separately house particular electronics or communication systems. However, such systems can be costly and take up a lot of space. Furthermore, since wires can be exposed or partially exposed between cabinets, such systems may be susceptible to damage by the environment or by vandalism, for example.

SUMMARY

This disclosure in general describes multi-function cabinet examples. In particular, examples disclosed herein can facilitate the housing of electrical equipment.

Many cities store electrical equipment in multiple cabinets in the vicinity of certain utilities and infrastructure. Accordingly, the infrastructure is housed in different cabinets, often placed near one another. However, these cabinets are commonly placed on sidewalks. This placement reduces the amount of space that may be used by businesses or pedestrians and further has a visual impact.

Therefore, the present disclosure describes multi-function cabinet examples that can house different utilities. For example, certain multi-function cabinet examples disclosed herein can house high-voltage electrical metering and distribution components, high-voltage control electronics, battery backup and wireways, and low-voltage electronics. In this way, such examples can allow for the housing of multiple utilities in one cabinet. As a result, such examples reduce the need for space required to house certain utilities and the visual impact of the various cabinets. Such examples may also reduce the costs associated with manufacturing and installing a plurality of cabinets used to house such equipment.

One example includes a multi-function cabinet. The multi-function cabinet includes four compartments. Each compartment is configured to house a different type of electrical equipment. The electrical equipment may be high-voltage electrical metering and distribution components, high-voltage control electronics, battery backup, wireways, low-voltage electronics, or a combination thereof.

In a further example of the multi-function cabinet, the cabinet may house two or more utility applications. The first utility includes an electric meter and a circuit breaker panel housed in the first compartment. The second utility includes high-voltage equipment housed in the second compartment. The third compartment includes a battery backup. The fourth compartment includes a low-voltage wireway and an electronic component racking system.

In a further example of the multi-function cabinet, the third compartment of the cabinet includes a first wireway and a second wireway. The first wireway includes components which provide power to the first compartment. The second wireway includes components which provide power distribution from the second compartment to one or more external devices.

In a further example of the multi-function cabinet, the first wireway includes wires which power the first compartment. The second wireway includes wires which provide power distribution from the second compartment to one or more external sources.

In a further example of the multi-function cabinet, each of the four compartments include at least one main door.

In a further example of the multi-function cabinet, the first wireway and second wireway include an auxiliary door.

In a further example of the multi-function cabinet, the auxiliary doors or main doors include a locking mechanism. The locking mechanism securely fastens the respective door when engaged and limits access to the components behind the respective door to authorized personnel.

In a further example of the multi-function cabinet, the first compartment includes a first main door providing access to the electric meter and a second main door providing access to the circuit breaker panel. The second compartment includes a third main door providing access to the second compartment. The first, second, and third main door include a locking mechanism.

In a further example of the multi-function cabinet, the first wireway includes a first auxiliary door. The second wireway includes a second auxiliary door.

In a further example of the multi-function cabinet, the components behind the first main door are only accessible to electrical service providers. The components behind the second and third main door are only accessible by users working on the high-voltage electrical distribution components.

In a further example of the multi-function cabinet, the first compartment, second compartment, and third compartments include doors on the front surface of the multi-function cabinet.

In a further example of the multi-function cabinet, the first compartment is located side-by-side with the second compartment. The third compartment is located beneath both the first and second compartments.

In a further example of the multi-function cabinet, the multi-function cabinet includes one or more side surfaces including a fourth compartment.

In a further example of the multi-function cabinet, the one of more side surfaces include one or more power connections. The first power connection is configured to receive energy from an external source and provide power to one or more components included in the multi-function cabinet. A second and third power connection are configured to provide power to one or more external components.

In a further example of the multi-function cabinet, the multi-function cabinet includes an air flow mechanism. The air flow mechanism includes one or more fans within the multi-function cabinet which distribute air throughout the multi-function cabinet. The air flow mechanism includes one or more panels including vent holes. The vent holes promote air distribution. The air flow mechanism further includes filters which distribute filtered air throughout the multi-function cabinet.

In a further example of the multi-function cabinet, the multi-function cabinet includes fans located within a top portion of the cabinet. One or more panels are included on one or more side surfaces.

In a further example of the multi-function cabinet, the multi-function cabinet includes a base. The base supports the first, second, third, and fourth compartments.

In a further example of the multi-function cabinet, the base includes a plurality of conduits. The plurality of conduits provide paths for connections to and from compartments of the multi-function cabinet and external components. The connections include wires, power cables, fiber-optic, or a combination thereof to provide communication or power between an external source and one or more compartments of the multi-function cabinet.

In a further example of the multi-function cabinet, the multi-function cabinet includes a separator. The separator is configured to separate the high-voltage components in the first, second, and third compartments from the low voltage components in the fourth compartment.

DETAILED DESCRIPTION

Various examples as described herein describe a multi-function cabinet comprising multiple sections such as a power distribution section, a communications section, and a control section.

Figure 1:
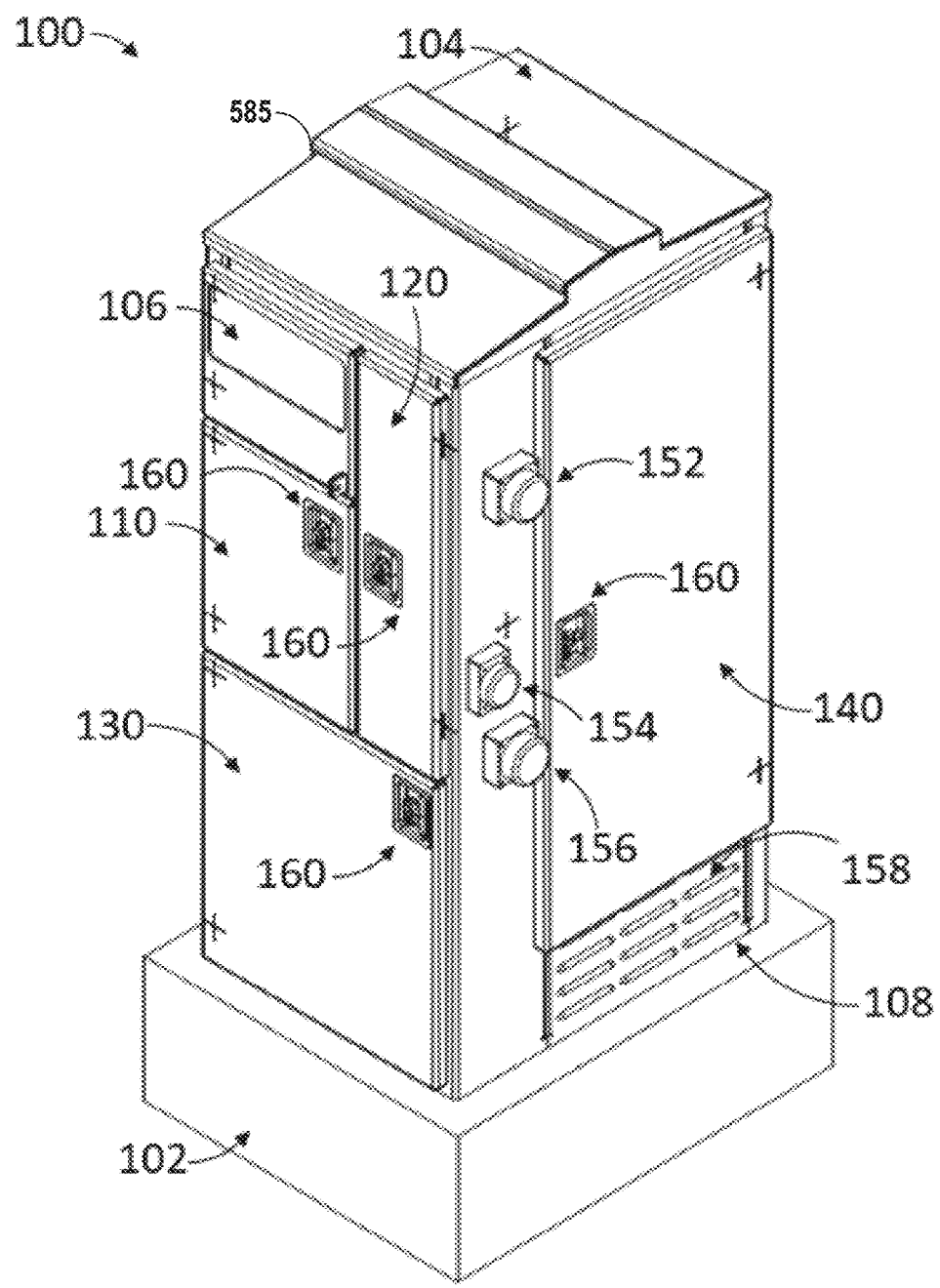
FIG. 1 illustrates an exemplary multi-function cabinet.

FIG. 1 provides an exemplary illustration of a multi-function cabinet 100. As shown, the multi-function cabinet 100 may comprise a base 102 as well as a top portion 104. Additionally, the multi-function cabinet 100 may comprise a plurality of compartments. As shown in FIG. 1, the multi-function cabinet 100 may comprise compartment 110, compartment 120, compartment 130, and compartment 140. The multi-function cabinet 100 may be made out of various types of materials, such as metals (for example, steel or aluminum), plastics, or composite materials, or any other material capable of handling the functions disclosed herein. In some examples, the one or more materials may provide a durable shell such as to keep the components comprised within the multi-function cabinet 100 protected from external harm, such as from environmental conditions (rain, snow, dust, for example) vandalism, or other conditions that may otherwise cause damage to the components Each compartment (for example, compartments 110-140) may comprise components for a different purpose, such as for housing various different electronics components. In some examples, the organization of the multi-function cabinet 100 with various compartments for different purposes may allow for quicker maintenance, such as by only allowing access to the necessary compartments.

In some examples, compartment 110 may comprise high-voltage electrical metering and distribution components, compartment 120 may comprise high-voltage control electronics, compartment 130 may comprise a battery backup or access to one or more wireways, and compartment 140 may comprise low-voltage control electronics, although other arrangements of compartments 110, 120, 130, and 140 or other functions for compartments 110, 120, 130, and 140, may be possible and fall under the scope of the current disclosure. In an exemplary example, the multi-function cabinet 100 may be a utility cabinet located near public infrastructure, such as near traffic intersections or other forms of infrastructure requiring access to power sources. In previous designs, multiple utility cabinets are used to provide high-voltage electrical distribution, high-voltage control electronics, battery backup systems, and low-voltage communication equipment. Thus, an advantage of the example described with respect to FIG. 1 is the combination of all four utilities (for example, via compartments 110-140) into a single utility cabinet such as multi-function cabinet 100.

As described herein, the multi-function cabinet 100 may house components for multiple purposes in a more compact space compared to previous designs. Accordingly, the footprint for utility cabinets may be reduced, which can provide more space for other means or make the space more aesthetically pleasing. In other words, the multi-function cabinet 100 can reduce the area needed for installation while also reducing the visual impact of having multiple cabinets at once. Furthermore, by providing the utilities in one compact cabinet, the multi-function cabinet 100 can reduce the financial burden such as the purchase cost or installation cost of the consumer, since the consumer can simply acquire a single multi-function cabinet rather than a plurality of other cabinets.

Figure 2A:
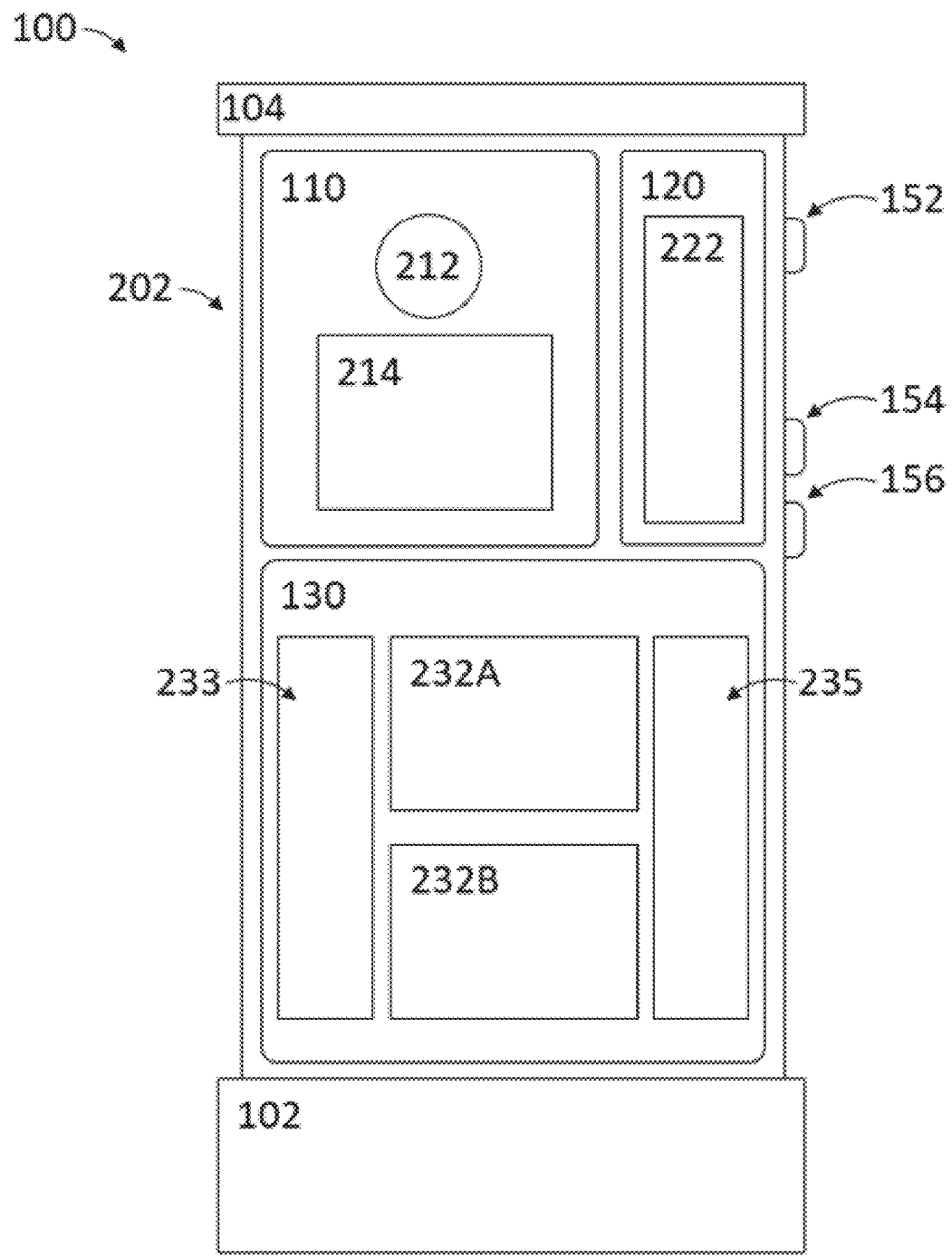
FIGS. 2A and 2B provide front views of the exemplary multi-function cabinet of FIG. 1.

Turning to FIG. 2A, FIG. 2A provides an exemplary view of a front surface 202A of multi-function cabinet 100. As shown, the compartment 110 may comprise an electric meter 212 as well as a circuit breaker panel 214 and compartment 120 may comprise high-voltage control equipment 222, such as a lighting controller for controlling street lights, parking lot lights, or other infrastructure lighting, as well as one or more electrical transfer switches for connecting to generators or other supporting power sources. As further shown in FIG. 2A, compartment 130 may comprise one or more battery backups 232A, 232B as well as one or more wireways 233, 235. The one or more wireways 233, 235 may provide access to various electrical service entrances, electrical distribution wireways, or combination thereof. The battery backups 232A, 232B may comprise one or more batteries to provide uninterrupted power to various components (for example, components comprised within compartment 140) comprised within the multi-function cabinet 100 in the case of a power outage or other disturbances. Thus, the multi-function cabinet 100 can provide power to important systems, such as surveillance systems or communications systems comprised within the multi-function cabinet 100 during hazardous or unforeseen conditions. In some examples, battery backups 232A, 232B may comprise deep cycle marine batteries, however, other batteries may be used, such as one or more 6 cell batteries wired together or any other battery configured to power multi-function cabinet 100 during outages, power fluctuations, or other power disturbances.

In some examples, the components comprised within compartments 110-140 may be commercial off-the-shelf (COTS) products rather than particular manufacturing products that can only be replaced by authorized dealers. Accordingly, this can make replacing, upgrading, or interchanging components in the multi-function cabinet 100 easier and more affordable than prior designs. In other words, any of the components within compartments 110-140 may be individually replaceable such that an individual component can be removed and replaced with a different component without affecting the remainder of the components within the various compartments.

As described herein, compartment 130 may comprise a first wireway 233 and a second wireway 235. The first wireway 233 may comprise components (for example, wires, cables, or other electrical connectors) which provide power to the compartment 110 and the second wireway 235 may comprise components (for example, wires, cables, or other electrical connectors) which provide power distribution for other compartments within the multi-function cabinet 100, external electrical systems, or combination thereof. Advantageously, such examples may separate high-voltage sections and low-voltage sections of the multi-function cabinet 100. This separation may be used as a safety precaution. For example, such separation may allow for users (for example, electricians, maintenance workers, inspectors, or other qualified operators) to be aware of whether they are in proximity of high-voltage components (for example, first and second wireways 233, 235 and compartments 110-130) or low-voltage components (for example, compartment 140).

Figure 2B:
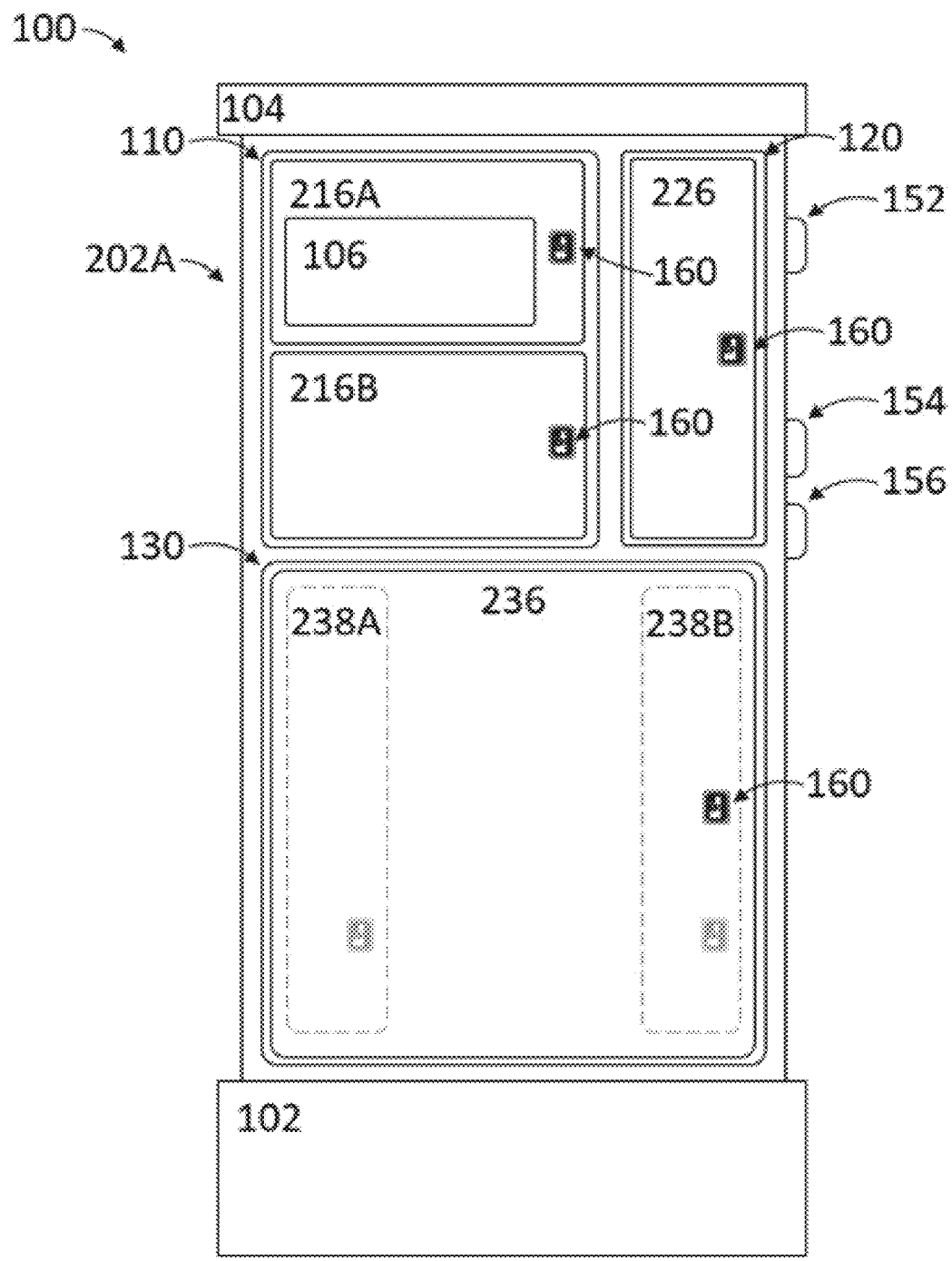
Figure 6A:
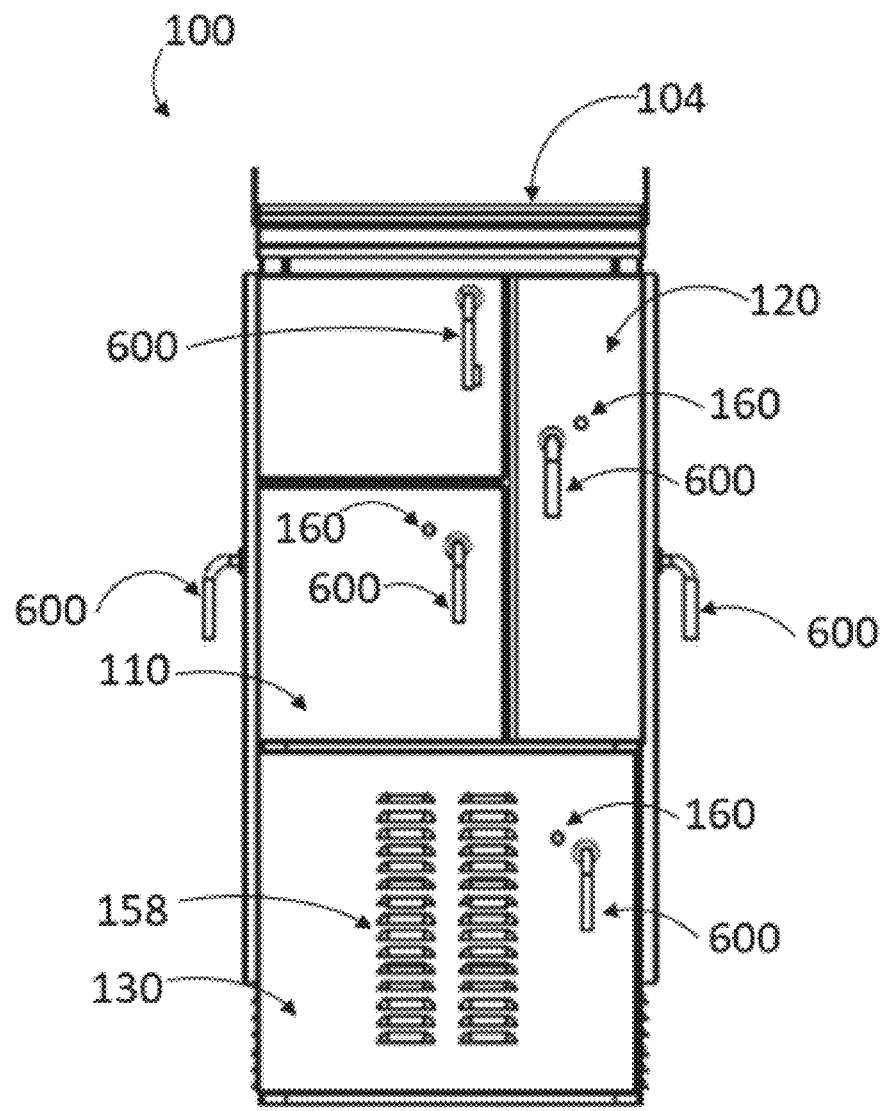
FIGS. 6A and 6B provide side views of another exemplary multi-function cabinet.
Figure 6B:
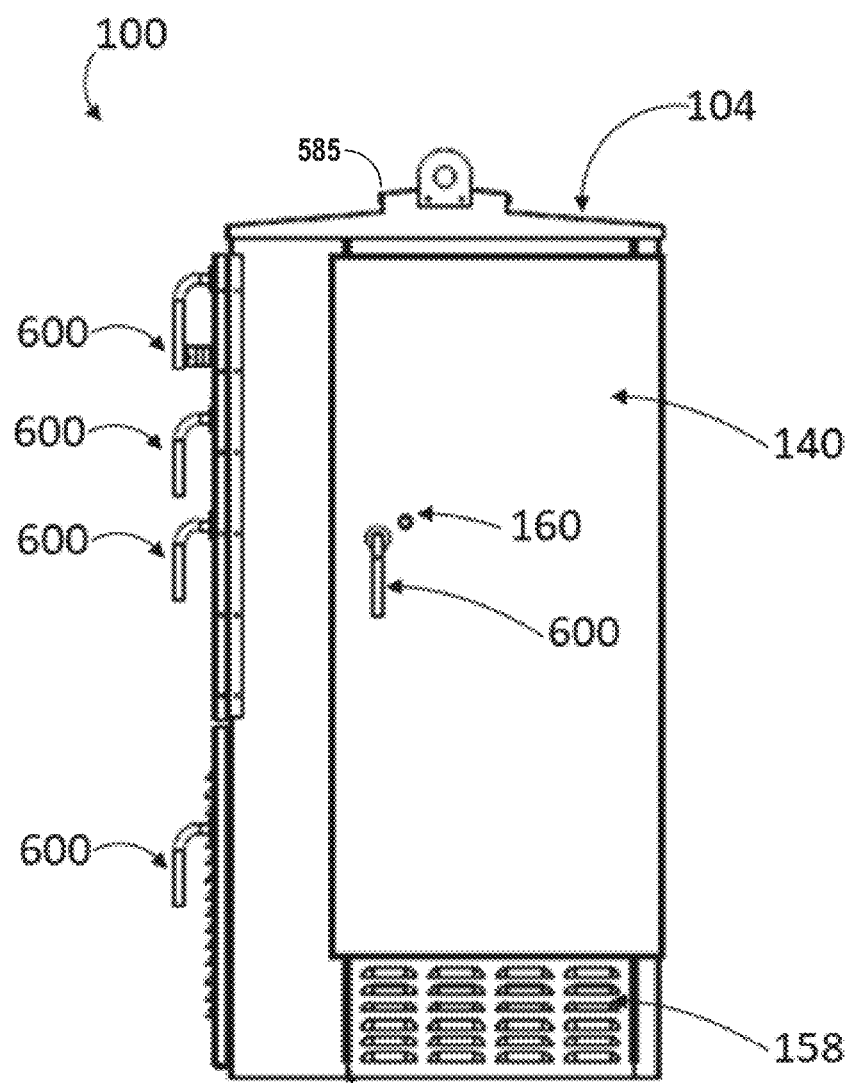

In some examples, each compartment may comprise one or more doors, such as generally illustrated in FIG. 1. FIG. 2B provides an exemplary view of front surface 202A of multi-function cabinet 100 comprising a plurality of doors. Each door may comprise a handle 600, as shown in FIGS. 6A-6B. Each compartment may comprise one or more doors to provide shelter from external forces (for example, rain or direct sunlight) as well as a safety feature to reduce unwanted tampering with internal components. In some instances, the door may be outfitted with one or more windows 106. As shown, compartment 110 may comprise two doors (door 216A and door 216B), compartment 120 may comprise door 226, and compartment 130 may comprise door 236. Furthermore, the compartments may comprise one or more internal doors, such as doors 238A and 238B of compartment 130. Doors 238A and 238B are illustrated with dashed lines, to illustrate that they may be located behind door 236. For example, if door 236 is open, a user may access doors 238A and 238B.

In some examples, one or more of the doors may comprise a locking mechanism 160. Each of the locking mechanisms 160 may be the same locking mechanism or alternatively, one or more of the locking mechanisms 160 may comprise a different locking mechanism. The locking mechanism 160 may comprise any locking mechanism known to one of ordinary skill in the art, such as lock and key, padlock, bolt, combination, latch, electrical lock, or other fastening mechanism, for example. In some examples, the locking mechanism 160 may be used to reduce the chance of the corresponding door opening on accident. Additionally or alternatively, the locking mechanism 160 may comprise one or more security measures (for example, via a key, combination, scanning device) to limit access to authorized personnel.

Turning to compartment 110, the door 216A may provide access to electric meter 212 and door 216B may provide access to the circuit breaker panel 214. Even though compartment 110 is shown to comprise two doors in FIGS. 1 and 2B, the compartment 110 may comprise any number of doors. For example, compartment 110 may comprise a single door for both the electric meter 212 and circuit breaker panel 214. Conversely, compartment 110 may comprise more than two doors, such as multiple doors for accessing different portions of the circuit breaker panel 214. Similarly, with respect to compartment 120, door 226 may provide access to one or more panels comprised within the compartment. Additionally or alternatively, compartment 130 may comprise a plurality of doors, wherein each door provides access to a different portion of compartment 130.

With respect to compartment 130, door 236 may provide general access to compartment 130 and doors 238A, 238B may further provide access the first wireway 233 and second wireway 235, respectively. In such examples, a user may access the first wireway 233 via both door 236 and door 238A and access the second wireway 235 via both door 236 and door 238B. As discussed herein, the locking mechanisms may comprise one or more locking mechanisms, such as a lock and key, a combination lock, a padlock, an electrical lock, a bolt, or other fastening mechanism. However, in some examples, one or more locking mechanisms may comprise one or more fasteners situated around the door. For example, a locking mechanism for door 238A, 238B may comprise a plurality of screws situated around the perimeter of doors 238A, 238B to securely fasten the doors.

In some examples, a user may have access to portions of the multi-function cabinet 100 based on the type of user or what actions the user is performing. Access may be provided via a locking mechanism located either on or adjacent to a door. For example, components comprised behind the door 216A and door 238A may be only accessible by electrical service providers working on electrical service components and components comprised behind door 226 and door 238B may be only accessible by users working on power distribution. By separating high-voltage service and distribution components as well as providing security measurements to reduce the risk of accidental exposure of users one or the other, the multi-function cabinet 100 provides similar safety advantages to having such components located in separate and distinct cabinets. Similar security precautions may be used for the low-voltage components comprised within compartment 140. To further the example, electrical service providers may not be able to access compartment 140; however, users working on surveillance and communication distribution may have access to compartment 140 and have restricted access to the components comprised behind door 216A and door 238A. Some examples restricting access to users, as described herein, can advantageously help prevent accidental exposures or tampering with components.

Figure 3A:
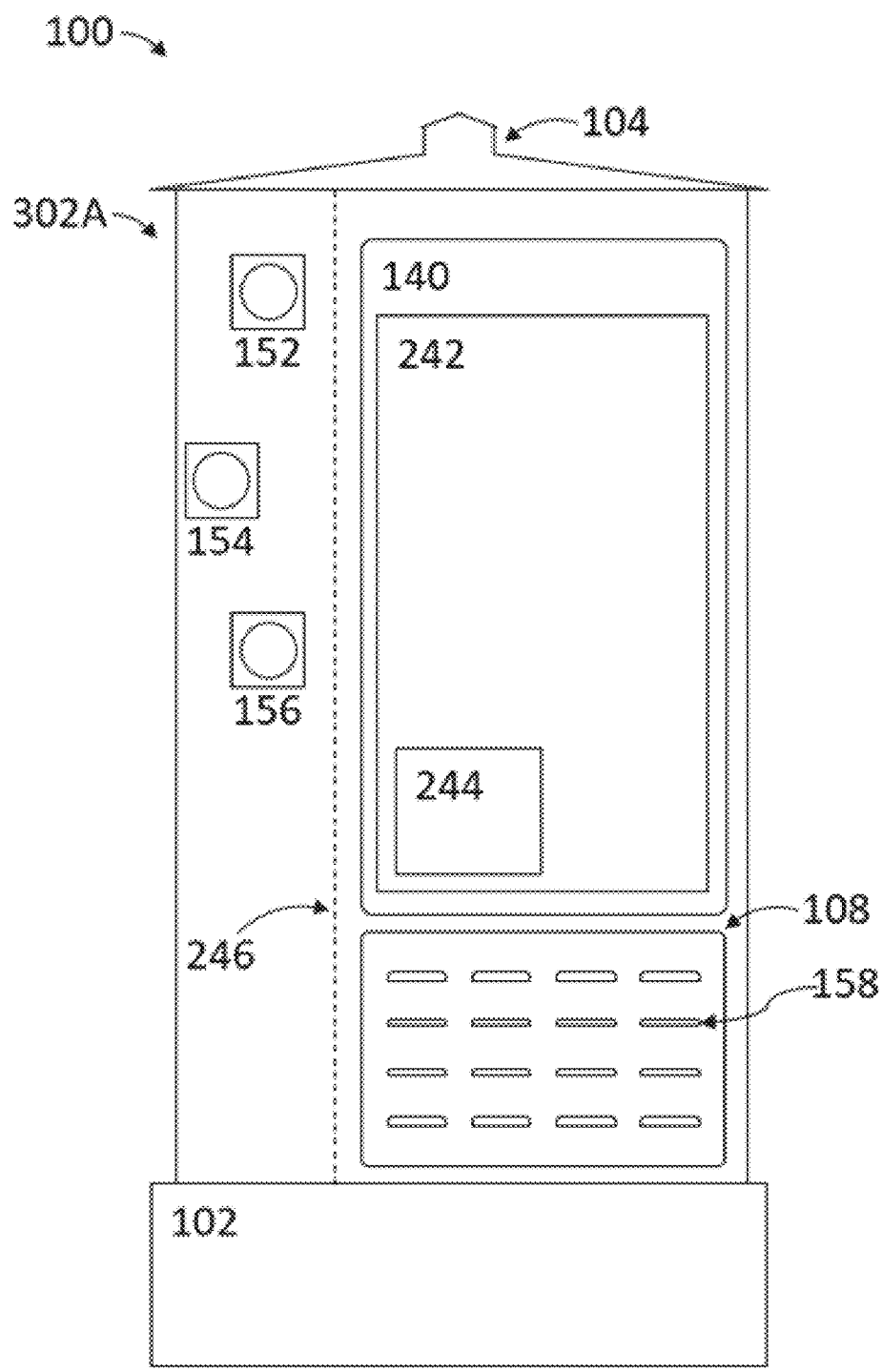
FIGS. 3A and 3B provide exemplary side views of the exemplary multi-function cabinet of FIG. 1.
Figure 3B:
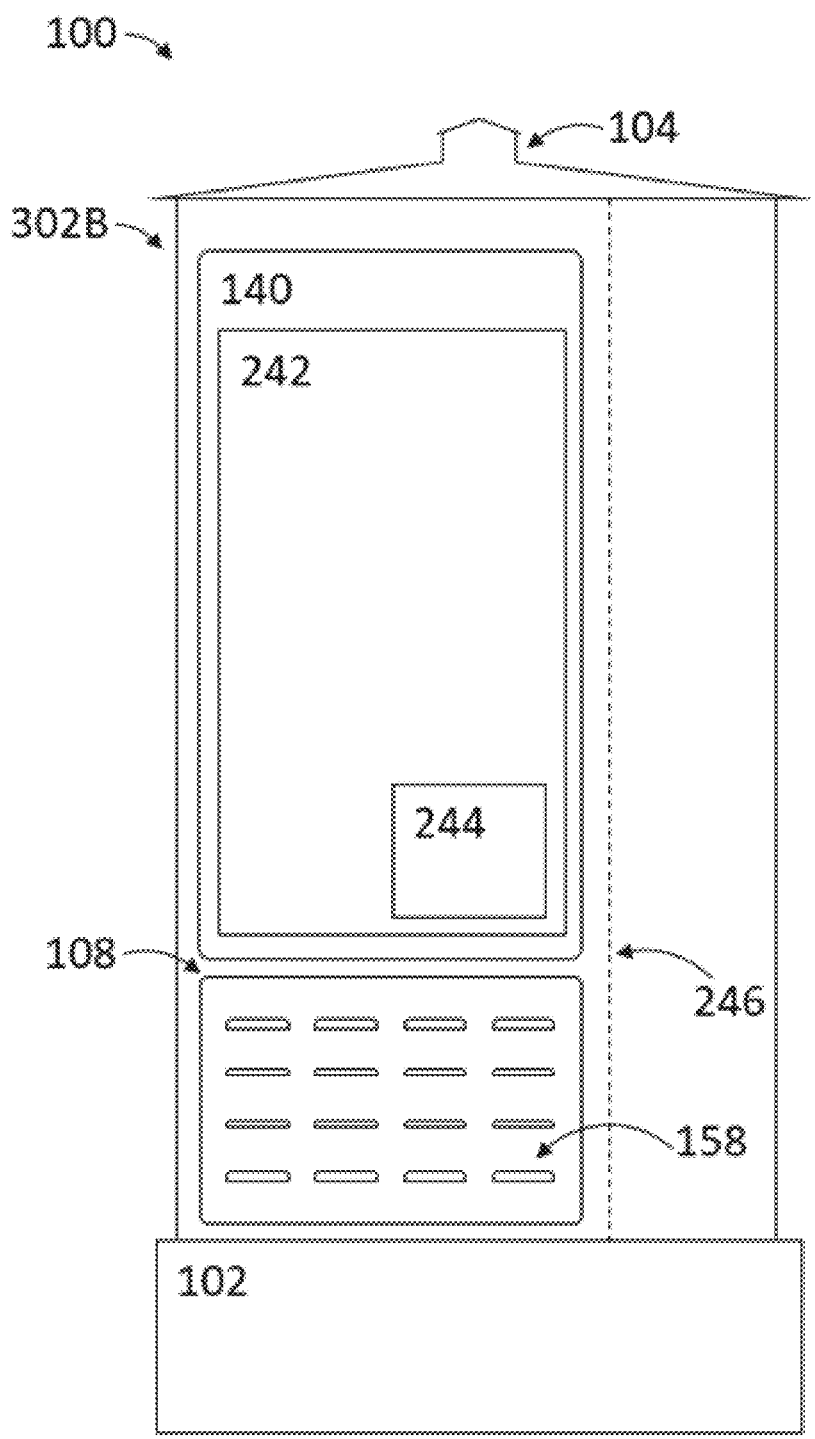

FIG. 3A provides an exemplary view of side surface 302A of the multi-function cabinet 100. In some examples, side surface 302A may be located on the side adjacent to compartment 120. In the exemplary example shown in FIGS. 1-3, this may comprise the right side of the cabinet. In some examples, each side (for example, the right side, the left side, the back side, or any combination thereof) may comprise similar components. Additionally or alternatively, one or more sides may comprise different components. For example, FIG. 3B provides an exemplary view of side surface 302B of the multi-function cabinet 100. As shown in FIGS. 3A and 3B, side surface 302A may comprise one or more power connections 152-156 whereas side surface 302B may not comprise the one or more power connections 152-156. Furthermore, in the exemplary example illustrated, side surfaces 302A and 302B comprise compartment 140 and panel 108. In some examples, the compartment 140 located on both side surfaces 302A and 302B may provide access to the same compartment. Additionally or alternatively, separate compartments may be located on each side.

In some examples, the multi-function cabinet 100 may comprise a wall or separator between high-voltage components and low-voltage components comprised within the multi-function cabinet 100. As shown in FIGS. 3A and 3B, the high and low-voltage components may be separated via separator 246. Separator 246 may be configured to provide a barrier between high-voltage components comprised within compartments 110-130 from the low-voltage components comprised within compartment 140. Separator 246 may comprise a variety of materials, such as non-conductive materials or metal alloys, or any other material capable of handling the functions disclosed herein. In some instances, separator 246 may comprise one or more openings holes, or combination thereof to transfer power, other signals, or a combination thereof between compartments comprising high-voltage components and compartments comprising low-voltage components. For instance, separator 246 may comprise one or more openings to allow the transfer of power between batteries 232A, 232B and compartment 140.

As described herein, the multi-function cabinet 100 may comprise one or more power connections 152-156 to provide or receive power for various situations. In some examples, power connection 152 may be configured to receive power, such as to provide power to one or more components located inside the multi-function cabinet 100, to provide power to one or more components which receives power via the multi-function cabinet 100, or a combination thereof. For instances, power connection 152 may be configured to receive energy from an external generator. Additionally or alternatively, power connections 154 and 156 can provide external power to a variety of sources, such as power at 30 amps 50 amps, or some other amount of amps. In some examples, power connections 154 and 156 may provide power for objects or events located in the proximity of the multi-function cabinet 100, such as to power event lighting, sound equipment, power tools, or other equipment or devices configured to receive power from the electrical components of the multi-function cabinet. In some examples, power connections 154 and 156 may be configured to provide power at different wattages. For example, power connection 154 may be configured to provide power at 30 amps whereas power connection 156 may be configured to provide power at 50 A. Various other configurations for the one or more power connections 152-156 have been contemplated. For example, greater or fewer power connections may be configured to receive power or provide power to external sources.

As shown in FIG. 1, compartment 140 may comprise one or more doors as similarly discussed with respect to FIG. 2B. Additionally, compartment 140 may comprise one or more locking mechanisms to limit any unwanted external exposure, limit access to authorized users, or both. Compartment 140 may comprise one or more low-voltage wireways and one or more electronic component racking systems 242. The one or more low-voltage wireways may provide access to electronics or connections to electronics comprised within compartment 140. Further, the one or more electronic component racking systems 242 may be used to house or support one or more components comprised within compartment 140. In some examples, compartment 140 may comprise a rack-mounted uninterruptable power supply (UPS) 244 to provide power distribution for components comprised within compartment 140, such as any rack-mounted electronic components. In some examples, the UPS 244 may be configured to receive power from the circuit breaker panel 214, the battery backup power from batteries 232A and 232B, or a combination thereof.

In some examples, multi-function cabinet 100 may provide airflow throughout the cabinet, such as to maintain safe temperatures or humidity levels for the components comprised within. The multi-function cabinet 100 may comprise one or more fans as well as one or more vents 158, such as vents 158 in panel 108. In some examples, the combination of fans or vents 158 may provide filtered air into the multi-function cabinet 100 or filter any exhaust being produced by the multi-function cabinet 100. The fans may be located in the roof of the multi-function cabinet. The vents 158 may be located at the bottom of the multi-function cabinet.

Figure 4:
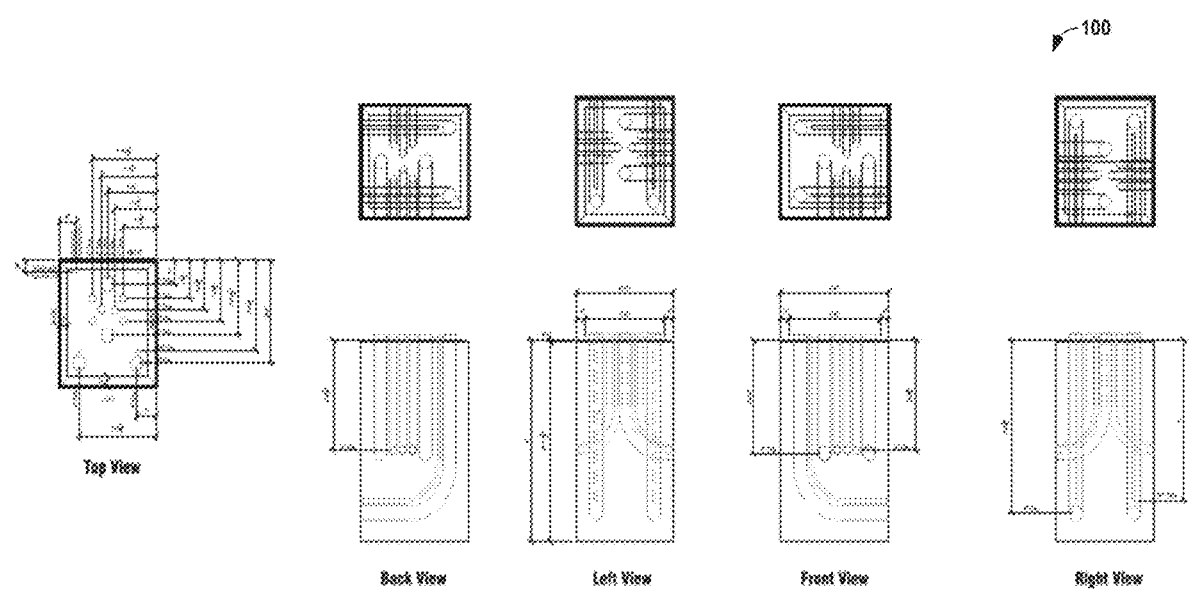
FIG. 4 provides a more detailed illustration of a base for the multi-function cabinet of FIG. 1.

FIG. 4 provides a more detailed illustration of an exemplary example of base 102. In some examples, base 102 may be made out of one or more strong materials capable of supporting the weight of the multi-function cabinet 100. For example, base 102 may comprise concrete, brick, various metals alloys, or other foundational materials known to one of ordinary skill in the art. As shown, base 102 may comprise a plurality of conduits. The plurality of conduits may provide paths for wires, power cables, fiber-optics, and the like to connect to and from the multi-function cabinet 100.

In addition to the examples described herein, the multi-function cabinet 100 may comprise a multi-function cabinet as described below and with respect to FIGS. 5A-E. FIGS. 5A-E provide an exemplary example of what a multi-function cabinet may be, such as with specific dimensions and layouts. However, one of ordinary skill in the art would understand that the dimensions are not limiting, and other measurements and components may be used, such as described herein.

Figure 5A:
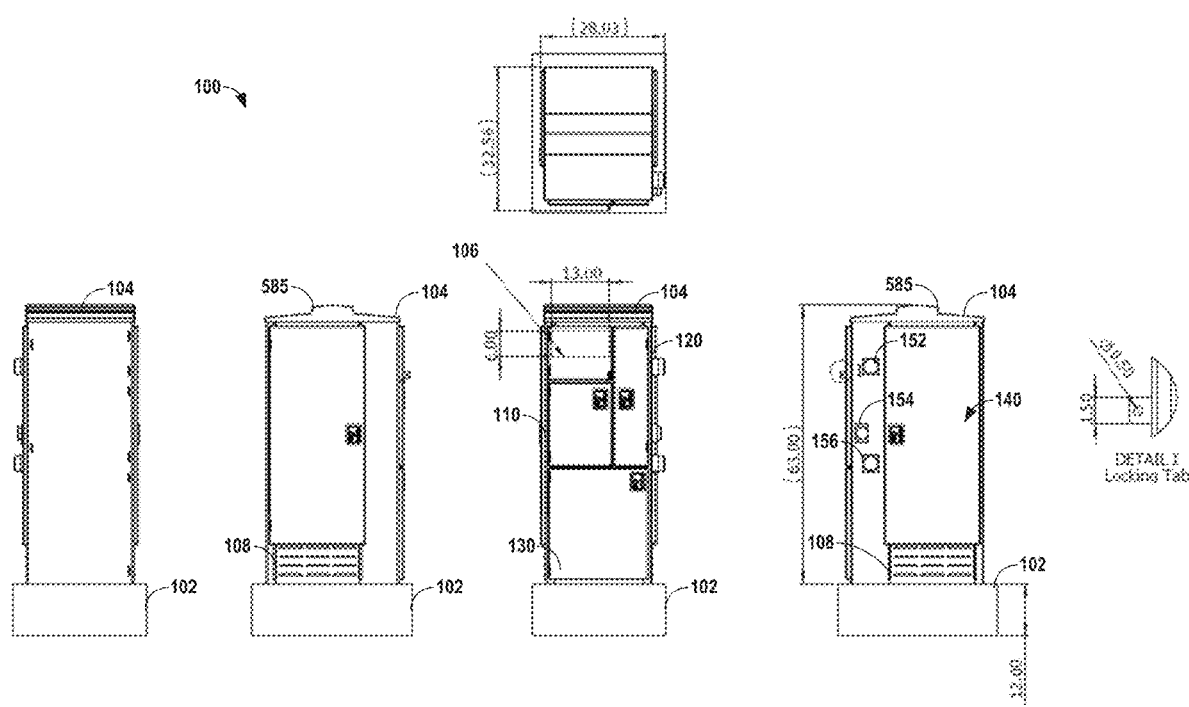
FIGS. 5A-E provide an example of a Multi-Function Cabinet.
Figure 5B:
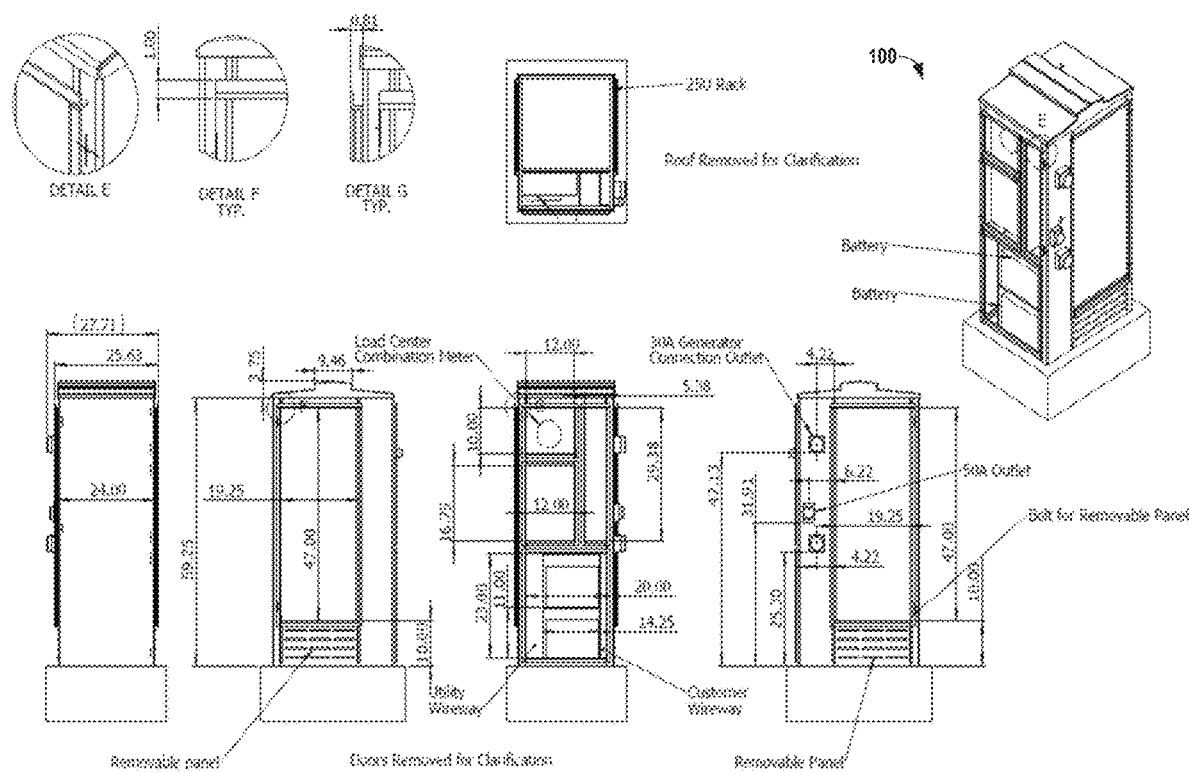
Figure 5C:
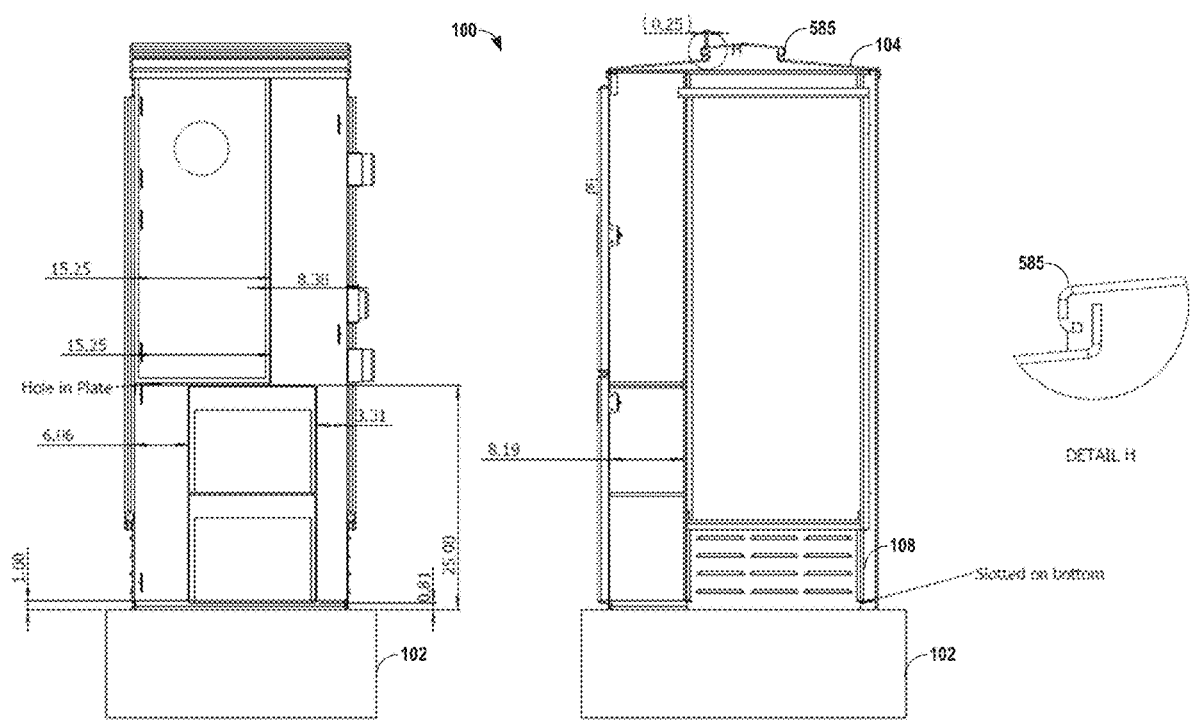
Figure 5D:
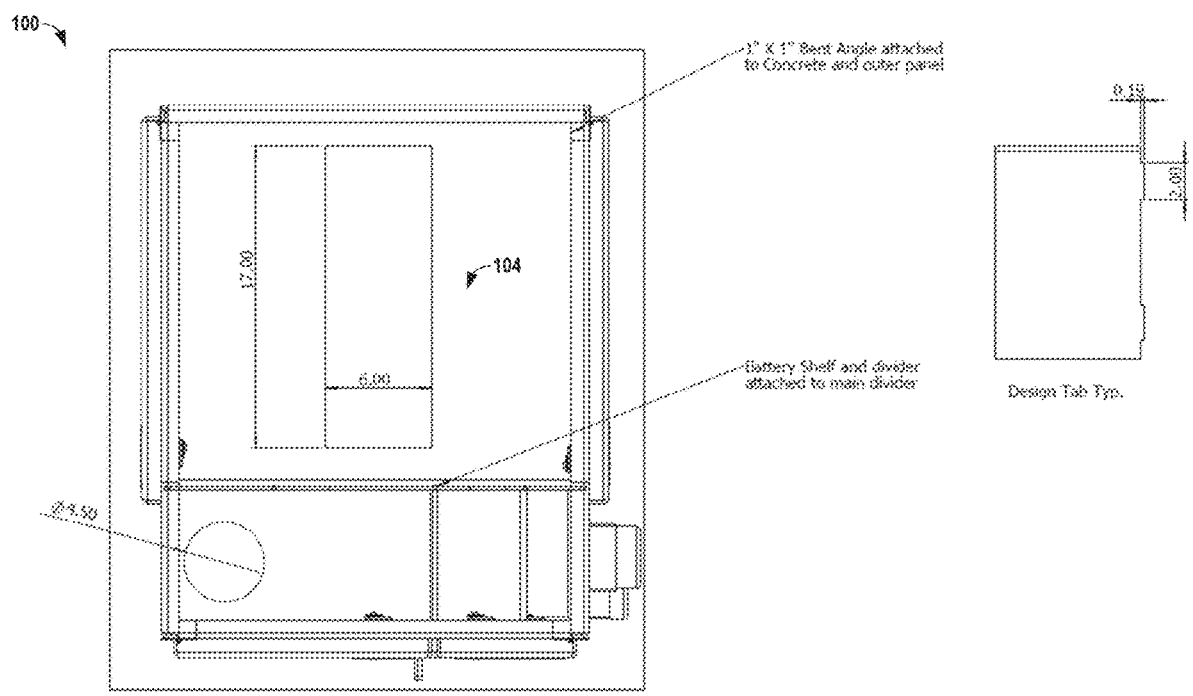
Figure 5E:
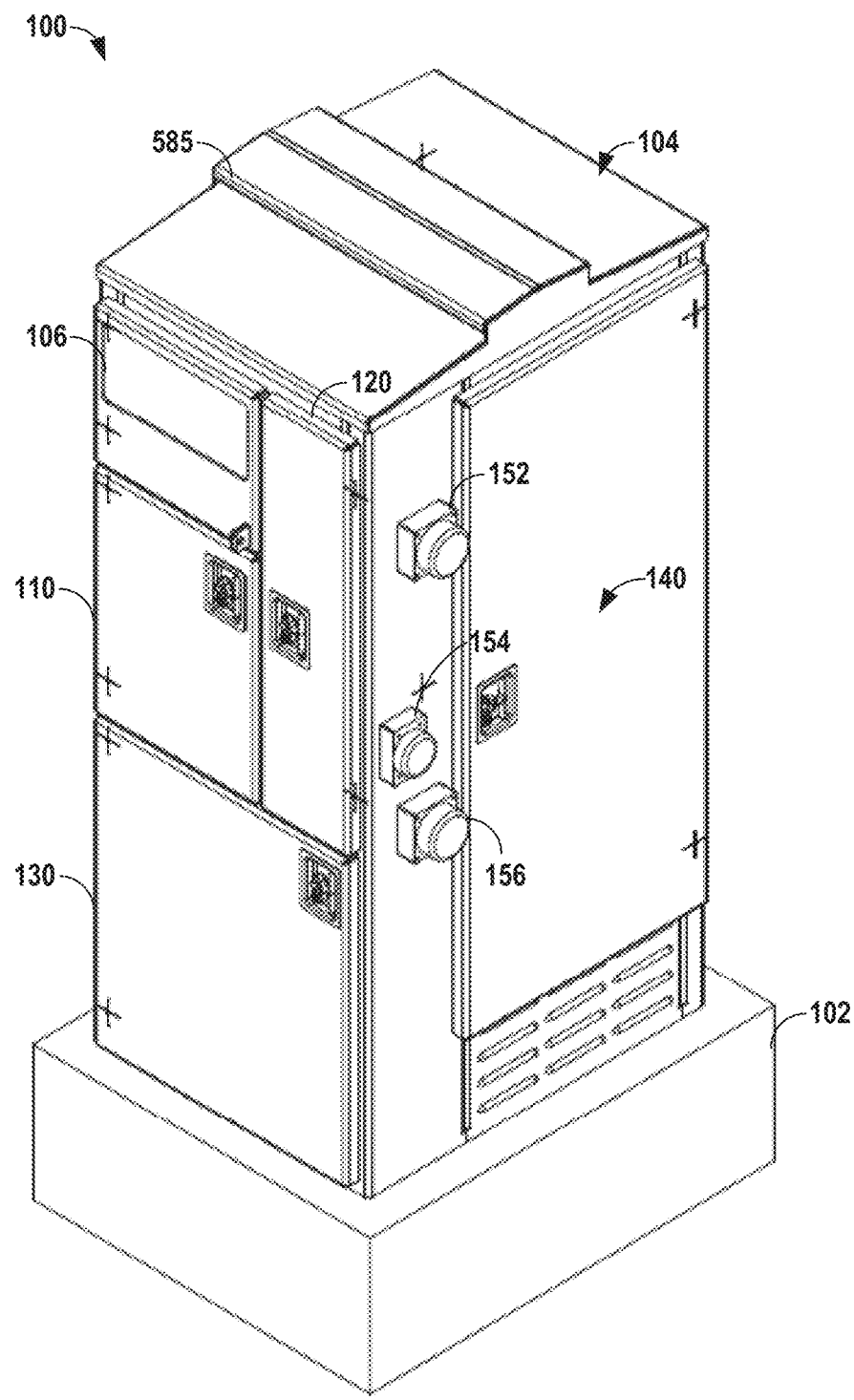

In some instances, roof 104 of cabinet 100 may include notch 585, as shown in FIGS. 5A-5E. A detailed view of notch 585 is shown in FIG. 5C. Notch 585 may be shaped into roof 104 such that roof 104 is not airtight to cabinet 100. In other words, notch 585 may create a gap in roof 104 such that air may escape as a fan located in base 102 blows air upwards through cabinet 100 and out of notch 585 in roof 104.

However, notch 585 may also be shaped into roof 104 such that water is not able to seep into the interior of cabinet 100. For instance, roof 104 may have a first portion that may, from a center point, be sloped downward away from the center point of roof 104. Notch 585 may be shaped into an outer edge of the initial slope of the first portion, overlapping a second sloping portion of the roof such that air from the interior may escape the gap between the first portion and the second portion but such that water cannot flow upwards into the gap between the first portion and the second portion. Shaping notch 585 into roof 104 provides the ventilation benefits of moderating the temperature of components inside cabinet 100, while also preventing water from interfering with the electronics present inside cabinet 100.

FIGS. 6A and 6B provide side views of another exemplary multi-function cabinet 100. In the example of FIG. 6A, cabinet 104 includes an instance of handle 600 on each of doors 110, 120, and 130. Similarly, in the example of FIG. 6B, cabinet 160 includes an instance of handle 600 on door 160. While shown as a single member extending outwards from cabinet 100 and downwards from the connection point, other examples of cabinet 100 may include other types or shapes of handles that provide functionality to assist a user in opening any of doors 110, 120, 130, 160, or any other door in the example of cabinet 100.

The Multi-Function Cabinet can combine the functionality of multiple cabinets or pedestals into a single cabinet, reducing the area needed for installation while also reducing the visual impact of multiple cabinets at one location. The Multi-Function Cabinet may reduce costs and provide the flexibility to expand or reduce the functionality needed for a particular installation.

In some examples, the Multi-Function Cabinet can handle many different communications, surveillance requirements along with metered underground service distribution, lighting controls, supervisory control and data acquisition (SCADA) systems and a self-contained battery backup system. For example, the Multi-Function cabinet can be used for surveillance, fiber-optic communications, street and parking lot lighting, traffic signal, a battery backup, event power supply (50 Amp), SCADA systems or other applications that may use the power supplies described herein. In some instances, the Multi-Function cabinet can be used for multiple applications at once, as described herein.

The robust design of the Multi-Function Cabinet can provide separate compartments for each of the functions, keeping high-voltage separate from low-voltage components. Multiple lockable doors provide convenient access to each of the compartments, including a utility provider access door for the electric service meter area. The Multi-Function Cabinet can be populated with industry standard components making replacement components and upgrades easy to source and install. In some examples, louvers in the removable panels covering the conduit entrance area and air exhaust on the roof provide filtered ventilation for the electronics in this rugged, pad mount enclosure.

The Multi-Function Cabinet can provide uninterrupted power through power outages and other disturbances, keeping communications and surveillance systems running under hazardous conditions. Additionally or alternatively, the Multi-Function Cabinet may provide power distribution and metering rated for 120 to 480 volts; single phase or three phase applications; 1, 2 or 3 pole main breakers; or may be rated at 100 amp or 200 amp, although other ranges or amounts for these characteristics, fitting within typical bounds known to one having ordinary skill in the art, may be possible.

In some examples, the Multi-Function Cabinets robust design meet the NEMA standards, UL industrial design standards, all-welded construction with stainless steel hardware, and wired conforming to NEC standards, UL standards, or other industry standards for design or electrical enclosures. The Multi-Function Cabinet can be an ideal for retrofit projects or new installations, installed free-standing on a concrete base or foundation.

In some instances, the Multi-Function Cabinet can measure 32" wide×28" deep and 66" tall, although other examples of multi-function cabinets in accordance with the devices described herein may have other measurements to be either smaller or larger than 32"×28"×66".

Various examples have been described. Such examples are non-limiting, and do not define or limit the scope of the invention in any way. Additional examples described with the respect to the invention are listed below. With respect to the examples described below, the limitations present in each of the examples described below are interchangeable. Dependencies between examples are provided, however such dependencies are provided for convenience and do not limit the scope to the dependencies provided. Any limitation provided the examples below may be combined with one or more limitations from one or more other examples listed below as well as one or more limitations described throughout this specification.

What is claimed is:

1. A multi-function utility cabinet, the multi-function utility cabinet comprising:
   a first compartment, the first compartment housing high-voltage electrical metering and distribution components, the high-voltage electrical metering and distribution components comprising an electrical meter and a circuit breaker configured to perform a first application of a utility;
   a second compartment, the second compartment housing high-voltage components configured to perform a second application of the utility;
   a third compartment, the third compartment housing a low-voltage wireway, an electronic component racking system and low-voltage components, the low-voltage components comprising low-voltage electronics; and
   a fourth compartment, the fourth compartment housing fourth compartment components, the fourth compartment components comprising a battery backup and one or more wireways, the one or more wireways comprising:
      a first wireway, the first wireway housing components which provide power to the first compartment, and
      a second wireway, the second wireway housing components which provide power distribution from the second compartment to one or more external devices,
   wherein the high-voltage electrical metering and distribution components and the high-voltage components are configured to operate at a higher voltage than the low-voltage electronics.

2. The multi-function utility cabinet of claim 1, wherein:
   the first compartment comprises a first main door providing access to the electrical meter and a second main door providing access to the circuit breaker;
   the second compartment comprises a third main door providing access to the second compartment; and
   the first main door, the second main door, and the third main door each comprise a locking mechanism.

3. The multi-function utility cabinet of claim 2, wherein:
   the components of the first wireway comprise wires to provide the power to the first compartment; and
   the components of the second wireway comprise wires to provide the power distribution from the second compartment to the one or more external devices.

4. The multi-function utility cabinet of claim 3, wherein each of the first wireway and the second wireway comprise an auxiliary door.

5. The multi-function utility cabinet of claim 4, wherein each of the auxiliary door of the first wireway and the auxiliary door of the second wireway comprise a locking mechanism configured to securely fasten the respective auxiliary door when engaged and limit access to the respective components behind the respective auxiliary door to authorized personnel.

6. The multi-function utility cabinet of claim 5, wherein each of the locking mechanism of the first, second, and third main doors and auxiliary doors of the first and second wireways are configured such that one or more users including the authorized personnel only have access to a portion of the multi-function utility cabinet.

7. The multi-function utility cabinet of claim 1, wherein each of the first compartment, the second compartment, the third compartment, and the fourth compartment comprise at least one main door.

8. The multi-function utility cabinet of claim 7, wherein:
   the high-voltage electrical metering and distribution components comprised behind the at least one main door of the first compartment are only accessible by electrical service providers; and
   the high-voltage components comprised behind the at least one main door of the second compartment and the fourth compartment components comprised behind the at least one main door of the fourth compartment are only accessible by users working on the high-voltage equipment and the fourth compartment components, respectively.

9. The multi-function utility cabinet of claim 8, wherein each of the at least one main doors comprise a locking mechanism configured to securely fasten a respective one of the at least one main doors when engaged and limit access to the components behind the respective one of the at least one main door to, the electrical service providers for components in the first compartment and the users for components in the second and fourth compartment.

10. The multi-function utility cabinet of claim 1, wherein the first compartment, the second compartment, and the fourth compartment each have a door on a front surface of the multi-function cabinet.

11. The multi-function utility cabinet of claim 10, wherein:
the first compartment is located side-by-side with the second compartment; and
the fourth compartment is located beneath each of the first compartment and the second compartment.

12. The multi-function utility cabinet of claim 11, further comprising one or more side surfaces, wherein the one or more side surfaces comprises the third compartment.

13. The multi-function utility cabinet of claim 12, wherein the one or more side surfaces additionally comprise one or more power connections, wherein a first power connection of the one or more power connections is configured to receive energy from an external source and to provide power to one or more of the components comprised within the multi-function utility cabinet, and a second power connection of the one or more power connections is configured to provide the power distribution to the one or more external devices.

14. The multi-function utility cabinet of claim 1, further comprising an air flow mechanism, the air flow mechanism comprising:
one or more fans comprised within the multi-function utility cabinet to distribute air throughout the multi-function utility cabinet;
one or more panels, the one or more panels comprising one or more vent holes to promote distribution of the air;
one or more notches in a roof of the multi-function utility cabinet, the one or more notches enabling ventilation of the air through the roof of the multi-function utility cabinet and preventing water from entering an interior of the multi-function utility cabinet; and
one or more filters to distribute filtered air throughout the multi-function utility cabinet.

15. The multi-function utility cabinet of claim 14, wherein the one or more fans are comprised within a top portion of the multi-function utility cabinet and the one or more panels are comprised on the one or more side surfaces of the multi-function utility cabinet.

16. The multi-function utility cabinet of claim 1, further comprising a base, the base supporting the first compartment, the second compartment, the third compartment, and the fourth compartment, wherein the base comprises a plurality of conduits, the plurality of conduits providing paths for connections to and from one or more of the first compartment, the second compartment, the third compartment, and the fourth compartment of the multi-function utility cabinet and the one or more external devices, the connections comprising wires, power cables, fiber-optic, or a combination thereof to provide communication and/or power between one of the one or more external devices and one or more of the components of the first compartment, the second compartment, the third compartment, and the fourth compartment of the multi-function utility cabinet.

17. The multi-function utility cabinet of claim 1, further comprising a separator, the separator configured to separate the high-voltage electrical metering and distribution components in the first compartment, the high voltage components in the second compartment, and the battery backup in the fourth compartment from the low-voltage electronics in the third compartment.

18. The multi-function utility cabinet of claim 1, wherein each of one or more of the high-voltage electrical metering and distribution components, one of more of the high-voltage components, the battery backup, one or more of the components in the one or more wireways, and the low-voltage electronics comprise an individually replaceable component.

* * * * *